UNITED STATES PATENT OFFICE.

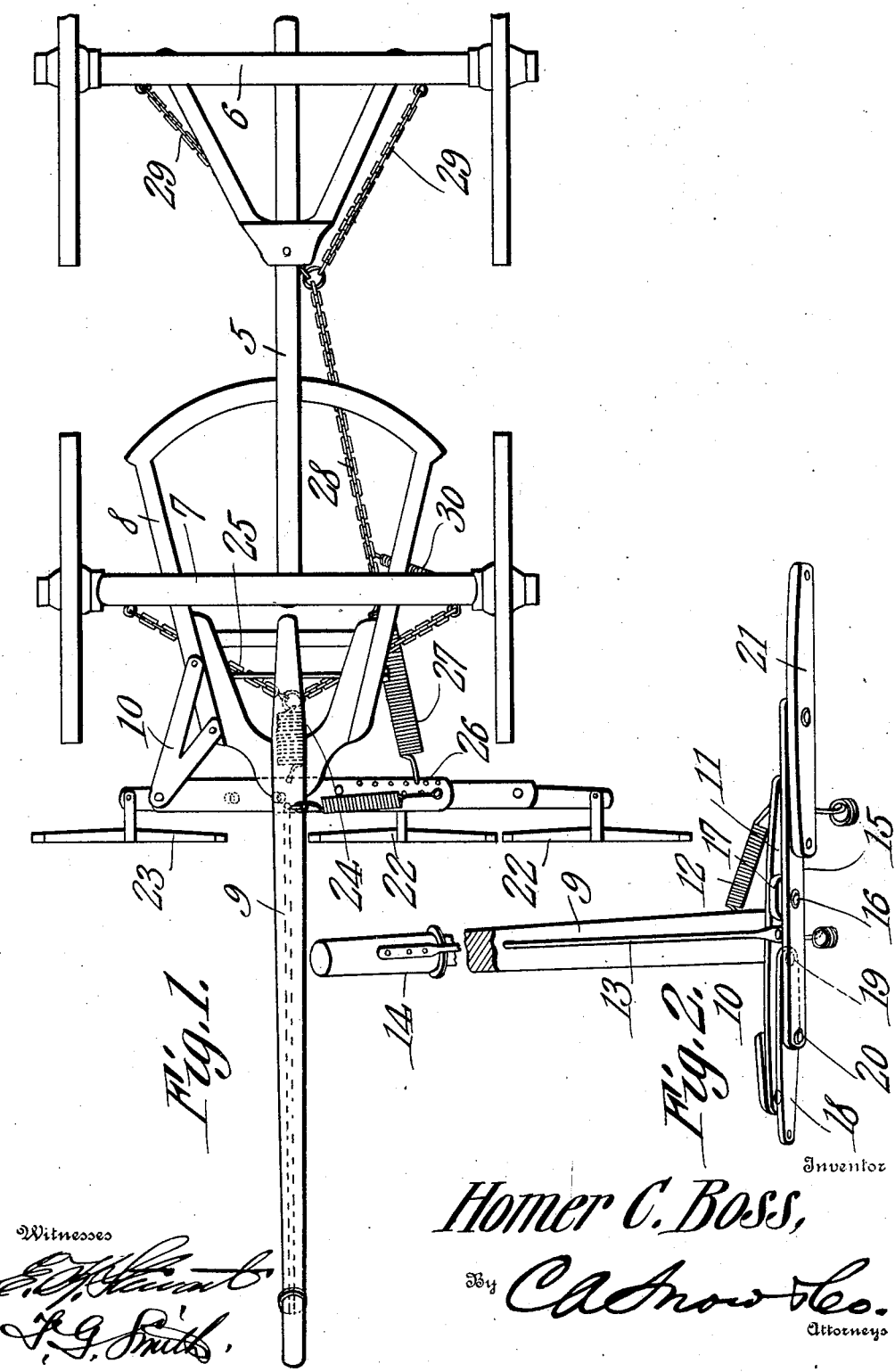

HOMER C. BOSS, OF BUFFALO, NEW YORK.

DRAFT-EQUALIZER.

998,154.  Specification of Letters Patent.  Patented July 18, 1911.

Application filed November 24, 1909. Serial No. 529,745.

*To all whom it may concern:*

Be it known that I, HOMER C. Boss, a citizen of the United States, residing at Buffalo, in the county of Erie and State of New York, have invented a new and useful Draft-Equalizer, of which the following is a specification.

It is the object of the present invention to provide an improved construction of draft equalizer, and the invention relates more specifically to that class of such devices which is designed for the connection therewith of three draft animals.

It is one object of the present invention to provide a draft equalizer of such construction that two draft animals may be hitched to the vehicle upon which the equalizer is mounted, to one side of the tongue or pole of the vehicle, and a single animal may be hitched to the vehicle at the other side of the pole.

The invention further aims to provide a draft equalizer so constructed that upon pull being exerted upon any of its elements, a substantially direct forward movement will be had, this movement being cushioned by suitable springs employed in connection with the equalizer, and normally holding the parts thereof in proper position.

In the accompanying drawings:—Figure 1 is a top plan view of a vehicle body, showing the invention applied thereto. Fig. 2 is a perspective view, looking at the under side of the tongue or pole of the vehicle body, and illustrating the draft equalizer mechanism in perspective.

In the drawings, the reach of the vehicle body is indicated by the numeral 5, the rear axle by the numeral 6, the forward axle by the numeral 7, the front hounds by the numeral 8, and the tongue or pole by the numeral 9, this tongue or pole being supported from the hounds 8 in the usual manner.

A bracket arm 10 is secured rigidly upon the hounds 8 and projects forwardly at an angle therefrom, and this bracket, as will be presently made apparent, may be located at either one side or the other of the tongue or pole 9. Pivoted at one end to the bracket arm 10 at its extremity is a draft bar, which is indicated by the numeral 11, and which extends transversely beneath the pole or tongue 9, and to the other side of the same, the opposite end of the said draft bar being supported by a spring 12 which is connected therewith and with the pole or tongue 9, or any other suitable fixed support.

A rod 13 is pivoted at its rear end to the draft bar 11 substantially midway between the ends thereof and extends longitudinally beneath the pole or tongue 9 and is permanently secured at its forward end to a sleeve 14, which is slidable upon the pole or tongue at the forward portion thereof, and with which sleeve the harness neck-yokes are to be connected, it being understood that the sleeve 14 will slide with the rod 13 and consequently the forward movement of the draft appliance will not result in disengagement of the harness neck yokes from the said sleeve 14.

An equalizer bar, indicated by the numeral 15, is swiveled as at 16 beneath the draft bar 11, and in spaced relation with respect thereto, spaced through the medium of block 17 through which the swivel bolt 16 passes. The bolt 16 passes through the equalizer bar 15 nearer one end than the other, and the first-mentioned end of the bar projects to one side of the tongue 9, whereas the other end projects to the other side of the said tongue, the bar being substantially normally in alinement or in a plane with the draft bar 11. Another equalizer bar, indicated by the numeral 18, is pivoted at its inner end as at 19 to the draft bar 11, at a point nearly midway of the ends thereof, and this equalizer bar 18 projects at its other end beyond the corresponding end of the said draft bar, and has a slot and pin connection 20 with the equalizer bar 15, at a point substantially midway of the ends of the bar 18.

Swiveled beneath the equalizer bar 15 at that end opposite to the end which has the slot and pin connection with the equalizer bar 18, is a double tree indicated by the numeral 21, and this double tree has connected to its ends swingletrees 22, there being a swingletree 23 connected to that end of the equalizer bar 18 opposite its pivoted ends.

From the foregoing it will be understood that the draft bar 11 may swing upon its pivot, and that the two equalizer bars 15 and 18 swing upon the pivots which connect them with the draft bar 11, and that a pull upon the outer end of the equalizer bar 15 will result in the equalizer bar 18 being swung upon its pivot.

A spring 24 is connected at its forward end to the draft bar 11 at a point substantially midway of the ends thereof, and at its other end to the forward ends of chains 25, which, at their rear ends are attached to the front axle 7 of the vehicle, and adjacent each end thereof. This spring 24 as will be readily understood, tends normally to hold the draft bar 11, together with the equalizer bar and double and swingle trees carried thereby, at the rearward limit of their movement. The draft bar 11 is formed with a plurality of openings 26, which extend in a series from about the swivel bolt 16 to the adjacent end or terminal of the bar and engaged with these openings interchangeably is the forward end of a spring 27, which at its rear end connects with a chain 28, having branch chains 29 connected at their rear ends to the rear axle 6 of the vehicle, this spring serving to take up the slack of the chains 28 and 29 when the outer end of the equalizer bar 15 and the corresponding end of the draft bar 11 are swung rearwardly. It will be further understood from the foregoing that the tension of the spring 27 may be readily varied by adjusting the connection of this spring with the draft bar 11, and further that the pull or stress exerted upon the draft bar 11 and the equalizer bars 15 and 18 will be against the tension of the springs 27 and 24, and that the resistance to such force may be increased or diminished by adjustment of the spring 27 at its forward end in one or the other of the openings 26.

A spring 30 is connected at its lower end to the chain 28 at any suitable point in its length, and at its upper end is secured to the front axle bolster, and serves as an additional support for the chain.

What is claimed is:—

In draft apparatus, the combination with the front axle and tongue of a vehicle body, of a bracket projecting from one side of the tongue, a draft bar pivoted to the bracket, an equalizer bar swiveled upon the draft bar, a second equalizer bar pivoted to the draft bar and having slot and pin connection with the first mentioned equalizer bar, whiffletrees connected to the equalizer bars, a sleeve slidable upon the tongue and arranged for the connection of a harness neck yoke, and a rod connected to the sleeve and to the draft bar.

In testimony that I claim the foregoing as my own, I have hereto affixed my signature in the presence of two witnesses.

HOMER C. BOSS.

Witnesses:
  EUGENE P. Boss,
  Mrs. E. P. Boss.

---

Copies of this patent may be obtained for five cents each, by addressing the "Commissioner of Patents, Washington, D. C."